United States Patent
Nishiki et al.

(10) Patent No.: US 7,310,465 B2
(45) Date of Patent: Dec. 18, 2007

(54) OPTICAL PULSE TIME SPREADING DEVICE

(75) Inventors: Akihiko Nishiki, Tokyo (JP); Kensuke Sasaki, Kanagawa (JP); Shuko Kobayashi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/520,661

(22) Filed: Sep. 14, 2006

(65) Prior Publication Data
US 2007/0058902 A1 Mar. 15, 2007

(30) Foreign Application Priority Data
Sep. 15, 2005 (JP) ............................. 2005-267973

(51) Int. Cl.
*G02B 6/34* (2006.01)
(52) U.S. Cl. .......................................... 385/37; 385/14
(58) Field of Classification Search ................. 385/37, 385/14
See application file for complete search history.

(56) References Cited

U.S. PATENT DOCUMENTS

| | | | | |
|---|---|---|---|---|
| 5,995,255 | A * | 11/1999 | Giles | 398/34 |
| 7,174,103 | B2 * | 2/2007 | Nishiki et al. | 398/77 |
| 2004/0175177 | A1 * | 9/2004 | Lee et al. | 398/72 |
| 2006/0018595 | A1 * | 1/2006 | Sasaki | 385/37 |
| 2007/0122153 | A1 * | 5/2007 | Tamai | 398/77 |

OTHER PUBLICATIONS

"0Gb/s×2ch Signal Unrepeated Transmission Over 100 km of Data Rate Enhanced Time-spread/Wavelength-Hopping OCDM Using 2.5-Gb/s FBG En/Decoder", S. Kutsuzawa et al., IEEE Photonics Technology Letters, vol. 15, No. 2, pp. 317-319 Feb. 2003.

"FBG based Optical Code En/Decoder for long distance transmission without dispersion compensating devices", Hideyuki Iwamura, et al., Optical Society of America, 2004 WK6.

"Experimental Demonstration and Scalability Analysis of a Four-Node 102-Gchip/s Fast Frequency-Hopping Time-Spreading Optical CDMA Network", Varghese Baby, et al, IEEE Photonics Technology Letters, vol. 17, No. 1, pp. 253-255, Jan. 2005.

* cited by examiner

*Primary Examiner*—Ellen E. Kim
(74) *Attorney, Agent, or Firm*—Rabin & Berdo, P.C.

(57) ABSTRACT

The present invention is an SSFBG with which there are few restrictions on the code that can be set and the overall length of which is short. This SSFBG has four unit FBGs the Bragg reflection wavelengths of which are $\lambda_1$, $\lambda_2$, $\lambda_3$, and $\lambda_4$ disposed with a part where the unit FBGs overlap one another in the waveguide direction of the optical fiber. The left end of the horizontal axis corresponds to the position of the I/O terminal of the SSFBG and the right end of the horizontal axis corresponds to the terminal on the opposite side from the I/O terminal of the SSFBG. The Bragg reflection wavelengths $\lambda_1$, $\lambda_2$, $\lambda_3$, and $\lambda_4$ of the four unit FBGs are $\lambda_1=1543.28$ nm, $\lambda_2=1543.60$ nm, $\lambda_3=1543.92$ nm, and $\lambda_4=1544.24$ nm respectively. Codes ($\lambda_1$, $\lambda_2$, $\lambda_3$, and $\lambda_4$) used in the time-spreading/wavelength hopping system are established for the SSFBG by disposing the four unit FBGs at equal intervals such that the interval therebetween is 12.8 mm.

10 Claims, 6 Drawing Sheets

FIG. 8B

OPTICAL PULSE TIME SPREADING DEVICE

BACKGROUND OF THE INVENTION

1. Field of the Invention

The present invention relates to an optical pulse time spreading device that is suitable for use as an optical encoder or optical decoder that is employed in an optical code division multiplexing transceiver device of a time-spreading and wavelength-hopping system.

2. Description of Related Art

In recent years, the demand for communications has increased rapidly as a result of the popularization of the Internet and so forth. High-speed and high-capacity networks using optical fiber have accordingly been completed. Further, in order to establish high-capacity communications, optical multiplexing technology that transmits a plurality of channels' worth of optical pulse signals together via one optical fiber transmission line has become essential.

As optical multiplexing technology, optical time division multiplexing (OTDM), wavelength division multiplexing (WDM) and optical code division multiplexing (OCDM) have been intensively researched. Among these technologies, OCDM has the merit of flexibility on the operation side in having no restrictions on the time axis allocated one bit at a time for optical pulse signals that are transmitted and received in OTDM and WDM and so forth. Further, OCDM has the merit that a plurality of channels can be established in the same time slot on the time axis or a plurality of communication channels can also be established with the same wavelength on the wavelength axis.

OCDM is a communication method that allocates different codes (patterns) to each channel and extracts signals by means of pattern matching (See S. Kutsuzawa, et al., "10 Gb/s×2 ch Signal Unrepeated Transmission Over 100 km of Data Rate Enhanced Time-spread/Wavelength-Hopping OCDM Using 2.5-Gb/s FBG En/Decoder" IEEE Photonics Technology Letters, Vol. 15, No. 2 pp. 317-319, February 2003 or Hideyuki Iwamura, et al. "FBG based Optical Code En/Decoder for long distance transmission without dispersion compensating devices" Optical Society of America 2004 WK6, for example). That is, OCDM is an optical multiplexing technology that encodes an optical pulse signal by means of optical codes that are different for each communication channel on the transmission side and which restores the original optical pulse signal by performing decoding by using the same optical codes on the reception side as on the transmission side.

With OCDM, because only an optical pulse signal that matches the code when the optical pulse signal has been encoded is extracted and processed as an effective signal during decoding, an optical pulse signal that consists of light rendered by combining the same wavelength or a plurality of wavelengths can be allocated to a plurality of communication channels. Further, with OCDM, because the same code as the code used for encoding must be used in order to perform decoding on the reception side, decoding is not performed unless the optical code is known. Hence, OCDM is a transmission method that is also superior in the stability and security of information.

A passive light element that does not consume power such as a Superstructured Fiber Bragg Grating (SSFBG) or an Array Waveguide Grating (AWG) can be used as the optical encoder. Hence, an increase in the communication rate is possible without receiving an electrical processing speed restriction. Further, a plurality of channels can be multiplexed at the same time and same wavelength and large-capacity data communications may be performed. That is, in comparison with OTDM and WDM and so forth, the focus is on the fact that the communication capacity can be rapidly increased.

Time spreading and wavelength hopping systems are known as encoding means. When time spreading and wavelength hopping systems are applied to OCDM, encoding that considers not only time but also wavelength is performed. Time spreading and wavelength hopping systems will appear as 'time spreading/wavelength hopping method' hereinbelow. Further, the code used in the time spreading and wavelength hopping systems will appear as 'time spreading/wavelength hopping code'.

OCDM which uses the time spreading/wavelength hopping method is a transmission method that is performed via the following steps. First, on the transmission side, the output of a multiple wavelength continuous wave light source or wide bandwidth light source is converted into an optical pulse train and, based on this optical pulse train, a transmission signal constituting a binary digital signal is converted into an RZ (return to zero) optical pulse signal to generate the optical pulse signal to be transmitted. This optical pulse signal is transmitted after being encoded by the optical encoder. Meanwhile, on the reception side, the transmitted optical pulse signal is played back as a result of decoding by the optical decoder for which the same code as the code set for the optical encoder above has been set.

In the case of OCDM that uses the time spreading/wavelength hopping method, the optical pulse on the time axis constituting the RZ optical pulse signal is constituted comprising light of a plurality of wavelengths and one optical pulse is wavelength-divided by the optical encoder and arranged spread on the time axis. Further, the same wavelength components are also similarly arranged spread on the time axis by the optical encoder in accordance with fixed regulations (code set for the optical encoder). Hence, the time-spreading/wavelength hopping method has the benefit that encoding is possible by means of two degrees of freedom which are time and wavelength. As a result, in comparison with a case where encoding is performed by means of the time-spreading method with an optical pulse signal consisting of a single wavelength serving as the target of the encoding, encoding in which wavelength is also considered can be executed and there is therefore the merit that confidentiality can accordingly be improved.

As mentioned earlier, in the time-spreading/wavelength hopping method, the element fulfilling the role of arranging the optical pulse constituting the optical pulse signal on the time axis through wavelength-division is the optical encoder. Thereafter, an optical pulse (an optical pulse of a single wavelength) dispersed on the time axis in this manner is also called a chip pulse. The chip pulse dispersed on the time axis is decoded by the optical decoder to obtain the optical pulse (an optical pulse containing a plurality of wavelengths) that constitutes the original optical pulse signal.

Thus, the optical encoder fulfils the role of breaking down the optical pulse constituting the optical pulse signal into chip pulses and spreading same on the time axis and is therefore also known as an optical pulse time spreading device. Further, the optical decoder fulfils the role of restoring the chip pulses to an optical pulse constituting the original optical pulse signal and therefore fulfils a role that is the reverse of that of the optical encoder. However, because the structure of the optical decoder is the same by virtue of this being an element for which the same code has been set, the optical decoder is also likewise called an optical pulse time spreading device. Therefore, when either the optical encoder or optical decoder is indicated in the subsequent description, either can also be represented as an 'optical pulse time spreading device'.

When utilized in an OCDM system, the roles of the optical encoder and optical decoder are determined by the point in which the optical encoder and optical decoder are disposed in the system. The time-spreading/wavelength hopping code set for both the optical encoder and optical decoder is the same. That is, if disposed on the transmission side, the optical pulse time spreading device functions as an optical encoder, whereas, if disposed on the reception side, the optical pulse time spreading device functions as an optical decoder.

An SSFBG, which is used as an optical pulse time spreading device in OCDM that uses the time-spreading/wavelength hopping method, is constituted by disposing a single Fiber Bragg Grating (FBG) with a Bragg reflection wavelength equal to the wavelength of light of a plurality of wavelengths constituting one optical pulse on the time axis. For example, when one optical pulse is constituted by the wavelengths $\lambda_1$, $\lambda_2$, $\lambda_3$, and $\lambda_4$, the SSFBG is constituted by arranging single diffraction gratings with the Bragg reflection wavelengths $\lambda_1$, $\lambda_2$, $\lambda_3$, and $\lambda_4$ respectively. The arrangement pattern of the signal diffraction gratings is decided by the codes set for the optical pulse time spreading device.

Apart from the SSFBG above, an element that is formed by connecting a power splitter, a thin-film filter, and a time delay section (See Varghese Baby, et al. "Experimental Demonstration and Scalability Analysis of a Four-Node 102-Gchip/s Fast Frequency-Hopping Time-Spreading Optical CDMA Network" IEEE Photonics Technology Letters, Vol. 17, No. 1 pp. 253-255, January 2005, for example) can also be used as the optical pulse time spreading device. Although such an element provides the benefit of not imposing restrictions on the code that can be set, on the other hand the light exposure is large in comparison with that of the SSFBG and there is also the problem that miniaturization of the whole element is difficult. Therefore, the focus was on usage of the SSFBG as the optical pulse time spreading device that was used in the optical code division multiplexing transceiver device.

As mentioned earlier, the SSFBG imposes a certain restriction on the time-spreading/wavelength hopping code that can be set. Such a restriction is not imposed on the optical pulse time spreading device formed by connecting a power splitter, thin-film filter, and time delay section. This certain restriction is a restriction that the relationship between the chip rate and chip size of the optical pulse time spreading device must be established so that the pulse width on the time axis with respect to one optical chip pulse is not wider than the minimum time interval between adjacent optical chip pulses. Subsequently, for the sake of expediency in the description, the minimum time interval of adjacent optical pulses will also be called the 'chip cycle'.

When the chip size is longer than the chip cycle, adjacent optical chip pulses that have been subjected to time-spreading/wavelength hopping encoding by the optical pulse time spreading device produces parts that overlap on the time axis. Hence, a situation where the two chip pulses cannot be completely wavelength-divided arises at the stage where the chip pulses are decoded.

In order to avoid such a situation, it is necessary to first widen the center wavelength interval of the spectral of light of a plurality of different wavelengths contained in one optical pulse forming the optical pulse signal. However, because the wavelength bandwidth of light that can be used in optical communications is in a limited range, this places restrictions on the widening of the center wavelength interval of the spectral.

Furthermore, the wavelength discrimination sensitivity of the optical pulse time spreading device must be raised. That is, the halfwidth of the output light output from the optical pulse time spreading device with respect to the wavelength must be narrowed. However, in order to narrow the half width of the output light with respect to wavelength, the FBG unit constituting the SSFBG used as the optical pulse time spreading device must be lengthened and the overall length of the optical pulse time spreading device is long, which constitutes an obstacle to practical use.

SUMMARY OF THE INVENTION

An object of the present invention is to provide an optical pulse time spreading device that is formed by using an SSFBG for which there are few restrictions on the code that can be set and the overall length of which can be shortened.

The optical pulse time spreading device of the present invention comprises an optical pulse time spreading device that outputs an optical pulse as a train of chip pulses sequentially arranged on a time axis on the basis of code of a time-spreading and wavelength hopping system, comprising: an I/O terminal; and phase control means that converts the optical pulse input from the I/O terminal into a chip pulse train of the chip pulses that is obtained by supplying a phase difference between mutually adjacent chip pulses and returns the chip pulse train to the I/O terminal. The phase control means comprises a plurality of unit diffraction gratings provided to correspond one for one with code values that constitute the code of the time-spreading and wavelength hopping system; and the plurality of unit diffraction gratings are disposed with a part where the unit diffraction gratings overlap one another in a waveguide direction of an optical waveguide. When an SSFBG is adopted as the phase controlling means, the optical waveguide corresponds to an optical fiber and the unit diffraction grating corresponds to a unit FBG. That is, an optical fiber in which a plurality of unit FBGs are disposed in the waveguide direction is an SSFBG.

The unit diffraction gratings are preferably formed as follows. That is, the unit diffraction gratings are formed as a periodic refractive index modulation structure formed by changing the refractive index periodically in a longitudinal direction of the optical waveguide; an envelope linking the maxima of a refractive index distribution also has a maximum in a periodic position in the longitudinal direction of the optical waveguide; and the size of the maximum value of the envelope is established to decrease monotonously after increasing monotonously in the longitudinal direction of the optical waveguide.

When the size of the change in the refractive index in the longitudinal direction of the optical waveguide is supplied as a function of the position in the longitudinal direction, the envelope of the curve representing the function is not strictly limited to passing through the maxima of the function. However, because a large difference is not produced even when the envelope approximately passes through the maxima, here, the envelope of the curve that expresses the above function is expediently known as an envelope that links the maxima of the refractive index distribution. Hence, when the maxima of the refractive index are said to be linked, this signifies the envelope of the curve expressing the above function.

The periodic refractive index modulation structure is divided so that only one maximum of the envelope is contained in each of the regions with the position in which the envelope takes a minimum value serving as the boundary. Further, the refractive index distribution is preferably formed so that the phase difference of the Bragg reflected light produced by each of the adjacent regions is equal to $\pi$. Subsequently, a part of the periodic refractive index modulation structure in which the envelope of each of the above regions is contained is also known as a sub-refractive index modulation structure.

In keeping with the form in which the optical pulse time spreading device of the present invention is used, the proportion of the increase of the maximum value of the envelope per unit length in the direction of propagation of light is preferably established greater than the proportion of the decrease of the maximum value or the proportion of the increase of the maximum value of the envelope per unit length in the direction of propagation of light is preferably established smaller than the proportion of the decrease of the maximum value.

Furthermore, the Bragg reflection wavelengths of the plurality of unit diffraction gratings constituting the phase control means are different and the group delay times of the respective unit diffraction gratings are set to monotonously grow longer as the distances from the I/O terminal of the positions in which the respective unit diffraction gratings are disposed increase.

The optical pulse time spreading device of the present invention comprises phase control means that convert an optical pulse into a chip pulse train and return same to the I/O terminal. The phase control means comprises a plurality of unit diffraction gratings. Further, the plurality of unit diffraction gratings are disposed with a part where the unit diffraction gratings overlap one another in the waveguide direction of the optical waveguide and, therefore, the overall length of the optical waveguide in which the unit diffraction gratings constituting the phase control means are arranged can be shortened. That is, the overall length of the phase control means can be shortened further than in a case where unit diffraction gratings are disposed such that same do not overlap one another by arranging the unit diffraction gratings with a part where same overlap one another.

Time-spreading/wavelength hopping code of a long code length can be set by a shortening of the overall length of the phase control means that is made possible by arranging unit diffraction gratings with an overlapping part and, to that extent, there can be an abundance of types of useable code. That is, there are few restrictions on the code that can be set for the phase control means and it is possible to provide an optical encoder that also permits a shortening of the overall length of the phase control means.

The following effects are obtained by establishing the size of the maximum value of the envelope that links the maxima of the refractive index distribution of the unit diffraction gratings so that the size decreases monotonously after increasing monotonously in the longitudinal direction of the optical waveguide. The spectral characteristic curve of the Bragg reflected light of the unit diffraction gratings thus formed is not a bell-shaped curve but rather a flat-top curve. Hence, the foot of the spectral characteristic curve of the Bragg reflected light of individual unit diffraction gratings is abruptly reduced close to the center wavelength of the Bragg reflected light and does not readily overlap the spectral characteristic curve of the adjacent Bragg reflected light.

Furthermore, when a periodic refractive index modulation structure is divided so that only one maximum of the envelope is contained in each region with the position in which the envelope takes a minimum value serving as the boundary, the spectral characteristic curve of the Bragg reflected light of the unit diffraction gratings is able to better approach the ideal flat-top curve by establishing the phase difference of the Bragg reflected light produced by the sub-refractive index modulation structure contained in each of the adjacent regions so that the phase difference is equal to $\pi$.

Therefore, even when the center wavelength interval of the spectral of the light of a plurality of different Bragg reflected light components is not widened, adjacent chip pulses of the chip pulse train can be decoded even when the chip pulses overlap one another on the time axis. That is, even when the center wavelength interval of the spectral of light of a plurality of different wavelengths contained in one optical pulse that forms the optical pulse signal is not widened, a situation where adjacent chip pulses cannot be separated can be avoided at the stage where the chip pulses are decoded.

As optical pulses or chip pulses input to the SSFBG constituting the phase control means are propagated by the SSFBG, a reduction in intensity of the Bragg-reflected component that corresponds to the energy occurs. Hence, in order to render the energy of the Bragg reflected light returned to the I/O terminal uniform and not dependent on the location of the Bragg reflection of the SSFBG, the degree of modulation of the refractive index must be increased at increased separation from the I/O terminal. That is, if the proportion of the increase per unit length in the propagation direction of light of the maximum value of the envelope that links the maxima of the periodic refractive index distribution is established to be greater than the proportion of the decrease, the energy of the Bragg reflected light can be rendered uniform and not dependent on the location of the Bragg reflection of the SSFBG.

By rendering the energy of the Bragg reflected light uniform and not dependent on the location of the Bragg reflection, the spectral characteristic curve of the Bragg reflected light of the unit diffraction gratings is able to approach the ideal flat-top curve more effectively.

Moreover, when the optical pulse time spreading device of the present invention is used as the optical encoder and the optical decoder of the optical code division multiplexing transceiver device, the position of the I/O terminal of the SSFBG constituting the phase control means is the reverse of that of the optical encoder and optical decoder. Hence, the following effects are obtained by setting the proportion of the increase per unit length in the direction of propagation of light of the maximum value of the envelope greater than the proportion of the decrease for the optical encoder and setting the proportion of the increase per unit length in the direction of propagation of light of the maximum value of the envelope smaller than the proportion of the decrease for the optical decoder. That is, the effect of rendering the energy of the Bragg reflected light of the optical encoder and optical decoder uniform is more effective as a result of the synergistic effect of the optical encoder and optical decoder and the spectral shape of the optical pulses obtained as a result of decoding can be made to better approach the ideal flat-top curve.

In addition, decoding can be accurately performed by establishing the opposite relationship between the optical encoder and optical decoder so that the group delay times of the respective unit diffraction gratings monotonously grows longer as the distance, from the I/O terminal, of the positions in which each of the unit diffraction gratings installed in the phase control means are disposed increases. This is because the relationship between the positions in which each of the plurality of unit diffraction gratings of different Bragg reflection wavelengths are disposed from the I/O terminal of the phase control means and the group delay time of the respective unit diffraction gratings are in a proportional relationship. Because equalization is possible by setting the positions, on the time axis, of the chip pulses output by the phase control means and the order of arrangement of the phase control means of the unit diffraction grating by adjusting and setting the group delay time of the respective unit diffraction gratings, setting the phase control means with the supplied time-spreading/wavelength hopping code can be implemented correctly by adjusting the group delay time of the respective unit diffraction gratings.

As described earlier, the spectral curve of the Bragg reflected light of the optical code division multiplexing transceiver device that comprises the optical pulse time spreading device of the present invention as an optical encoder and optical decoder has a flat-top shape and, therefore, the restrictions on the code that can be used are reduced further than in a case where a conventional optical pulse time spreading device is used.

Further, in comparison with a case where a conventional optical pulse time spreading device is used, the center wavelength interval of the spectral of light of a plurality of different wavelengths contained in one optical pulse forming the optical pulse signal can be narrowed. Further, a wide half width with respect to wavelength of the output light (chip pulses) output by the optical encoder is also obtained.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Embodiments of the present invention will be described hereinbelow with reference to the drawings. Further, each of the drawings shows an example according to the present invention and the present invention is not limited to the illustrated example. Further, although a case where the phase control means are formed using optical fiber has been adopted in this embodiment, the phase control means is not limited to optical fiber and can also be formed using a planar-type optical waveguide or the like. Whether the phase control means is formed using an optical fiber or a planar-type optical waveguide or the like is only a design item. However, when an optical pulse time spreading device is used in the optical communication system, because the optical communication system employs optical fiber as the light transmission line, usage of an optical pulse time spreading device constituted using optical fiber as the phase control means is often preferable.

Optical Pulse Time Spreading Device

Figure 1:
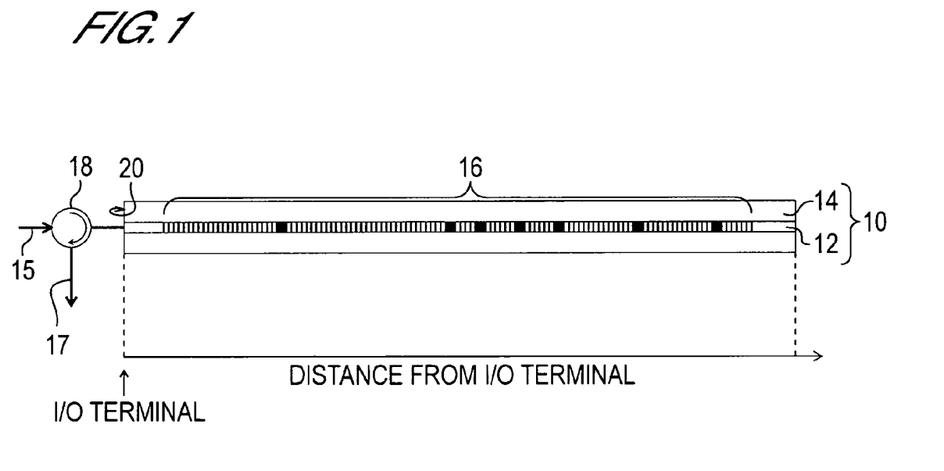
FIG. 1 shows a schematic structure of an optical pulse time spreading device.

The structure of the optical pulse time spreading device will now be described with reference to FIG. 1. FIG. 1 is a schematic structural diagram of an optical pulse time spreading device that comprises an optical circulator 18 for inputting an optical pulse 15 to an SSFBG 16 constituting phase control means and outputting a chip pulse 17. A schematic cross-section is shown for SSFBG 16 in FIG. 1.

The SSFBG 16 is attached to a core 12 of an optical fiber 10 that comprises the core 12 and cladding 14. The encoded optical pulse 15 is input to the core 12 from an I/O terminal 20 via the optical circulator 18. Bragg reflected waves are generated by the SSFBG 16 from the optical pulse thus input. The Bragg reflected waves constitute chip pulses which are output by the I/O terminal 20 once again. The chip pulses output by the I/O terminal 20 are extracted as chip pulses 17 to the outside via the optical circulator 18.

The present invention relates to the structure of the unit FBGs constituting the SSFBG 16 and to the disposition of the unit FBGs. The unit FBGs partially overlaps one another and, therefore, cannot be shown individually separated in FIG. 1. However, the SSFBG 16 is constituted by arranging a plurality of the unit FBGs in series in the waveguide direction of the core 12 constituting the optical waveguide of the optical fiber 10. Further, the correspondence relationship between the plurality of unit FBGs disposed in series in the core 12 and the time-spreading/wavelength hopping code is a relationship in which the respective unit FBGs arranged in a rightward direction from the I/O terminal 20 on the left end of the SSFBG 16 and the respective chips constituting the time-spreading/wavelength hopping code correspond with one another in a one-to-one relationship.

Here, the chips constituting the time-spreading/wavelength hopping code will be described. In the following description, the time-spreading/wavelength hopping code is also simply referred to as optical code unless a disturbance is produced. As an example, this will be described using a six-bit optical code $(0, \lambda_1, \lambda_2, 0, \lambda_4, \lambda_3)$. Here, the number of terms of the progression consisting of '0', '$\lambda_1$', '$\lambda_2$', '$\lambda_3$', and '$\lambda_4$' supplying the optical code is also called the 'codelength'. In this example, the codelength is six. Further, the progression that supplies the optical code is also called the 'code sequence' and the respective terms '0', '$\lambda_1$', '$\lambda_2$', '$\lambda_3$', and '$\lambda_4$' of the code sequence are also known as 'chips'. '0', '$\lambda_1$', '$\lambda_2$', '$\lambda_3$', and '$\lambda_4$' are also called code values.

The respective chips of the optical codes and the respective unit FBGs correspond as a function of the distance to the position in which each unit FBG is disposed from the I/O terminal 20 on the left end of the SSFBG 16, and the arrangement order of each term '0', '$\lambda_1$', '$\lambda_2$', '$\lambda_3$', and '$\lambda_4$' of the code sequence. That is, planned positions where the respective unit FBGs are to be disposed are determined at fixed intervals from the I/O terminal 20 on the left end of the SSFBG 16 and the respective chips of the optical code and the respective unit FBGs are associated by disposing any of the respective terms '0', '$\lambda_1$', '$\lambda_2$', '$\lambda_3$', and '$\lambda_4$' in these planned positions. This means that a unit FBG does not exist in position '0' of the code sequence and '$\lambda_1$', '$\lambda_2$', '$\lambda_3$', and '$\lambda_4$' signify that unit FBGs of Bragg reflection wavelengths '$\lambda_1$', '$\lambda_2$', '$\lambda_3$', and '$\lambda_4$' respectively are disposed.

The position in which a unit FBG is disposed signifies a position where the maximum for which the greatest maximum value is obtained exists among the maxima of the envelope of the curve representing the refractive index modulation of the unit FBG. When the distance from the I/O terminal 20 to the position where the unit FBG is disposed (also called the 'FBG position' hereinbelow) is expressed by 'L', L may be found by means of Equation (1) below by using the group delay time $t_g$ and group refractive index $n_g$.

$$L = c^{33}(t_g/(2n_g)) \tag{1}$$

In the subsequent description, the distance L from the I/O terminal 20 to the FBG position will also be expressed as the position L in which the unit FBG is disposed.

Here, c is the speed of light. The group refractive index $n_g$ is called the refractive index with respect to the flux of optical energy (pulses and so forth). In the case of unit FBGs with the Bragg reflection wavelengths $\lambda_1$, $\lambda_2$, $\lambda_3$, and $\lambda_4$ the spectrals of the Bragg reflected light reflected by each of the unit FBGs have a fixed width rather than full monochrome light (light with a spectral halfwidth of 0) which is $\lambda_1$, $\lambda_2$, $\lambda_3$, and $\lambda_4$ respectively. For example, in a case of a unit FBG for which the wavelength of the Bragg reflected light is $\lambda_1$, the spectral of the Bragg reflected light reflected by the unit FBG contains, other than the wavelength component $\lambda_1$, a component with a slightly smaller wavelength than $\lambda_1$, and a component with a slightly larger wavelength than $\lambda_1$. That is, this means that, in the case of a unit FBG with the Bragg reflection wavelength $\lambda_1$, the center wavelength of the spectral of the Bragg reflected light from the unit FBG is $\lambda_1$.

Hence, an average value for the spectral components contained in the Bragg reflected light of each unit FBG (the respective wavelengths of which are $\lambda_1$, $\lambda_2$, $\lambda_3$, and $\lambda_4$) is adopted and this is known as the 'group refractive index'. Also with regard to the group delay time $t_g$, the average delay time of a plurality of wavelength components contained in the Bragg reflected light reflected by the respective unit FBGs is called the 'group delay time'.

The position L in which the unit FBG is disposed is, as mentioned earlier, the distance to the position where the maximum at which the greatest maximum value is obtained exists among the maxima of the envelope of the curve representing the refractive index modulation of the unit FBG from the I/O terminal of the optical waveguide where the FBG is formed. Further, the group delay time is defined as the time up until the optical pulse has been input to the I/O terminal of the optical waveguide in which the unit FBG is formed, is reflected in the position of the unit FBG, and once again reaches the I/O terminal of the optical waveguide. Hence, during the group delay time, until a portion of the optical pulses input to the I/O terminal of the optical waveguide has been subjected to Bragg reflection and has once again reached the I/O terminal, light is propagated via the path 2L. Hence, a constant 2 is contained in the denominator of Equation (1).

Here, as an example, a case where a six-bit optical code (0, $\lambda_1$, $\lambda_2$, 0, $\lambda_4$, and $\lambda_3$) is set for the SSFBG 16 constituting the phase control means will be described. When a six-bit optical code (0, $\lambda_1$, $\lambda_2$, 0, $\lambda_4$, and $\lambda_3$) is set for the SSFBG 16 constituting the phase control means, unit FBGs with the Bragg reflection wavelengths $\lambda_1$, $\lambda_2$, $\lambda_3$, and $\lambda_4$ respectively are disposed as follows. First, unit FBGs with the Bragg reflection wavelengths $\lambda_1$ and $\lambda_2$ respectively are then disposed in that order without disposing a unit FBG in the closest position in which a unit FBG is to be disposed from the I/O terminal on the left end of the SSFBG 16. Further, unit FBGs with the Bragg reflection wavelengths $\lambda_4$ and $\lambda_3$ respectively are then disposed in that order without disposing a unit FBG in the fourth position in which a unit FBG is to be disposed from the I/O terminal on the left end of the SSFBG 16.

Unit FBG

The refractive index distribution of FBGs that exhibit a conventional-type Bragg reflection characteristic will now be described with reference to FIGS. 2A, 2B, and 2C. A conventional-type optical pulse time spreading device can be constituted if an SSFBG is formed with the FBGs shown here as the unit FBGs.

Figure 2A:
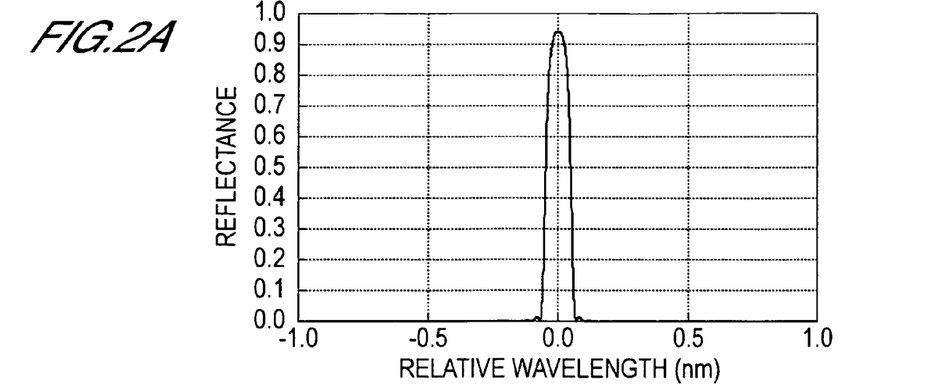
FIG. 2A-2C shows the refractive index distribution structure of an FBG that produces a normal Bragg reflection characteristic.

FIG. 2A shows a Bragg reflection spectral. The horizontal axis is a scale in which the relative wavelength is in nm units and the vertical axis shows the relative value of the size of the refractive index by means of an optional scale of 0 to 1. The relative wavelength shown on the horizontal axis has a Bragg reflection center wavelength of 0 nm and shows a range from the center wavelength that extends from wavelengths 1.0 nm shorter to wavelengths 1.0 nm longer than the center wavelength. For example, when the center wavelength of the Bragg reflection is 1550 nm, the wavelength corresponding to −1.0 nm is 1549 nm and the wavelength corresponding to 1.0 nm is 1551 nm. Hence, a Bragg reflection spectral for the range 1549 nm to 1551 nm is shown.

Figure 2B:
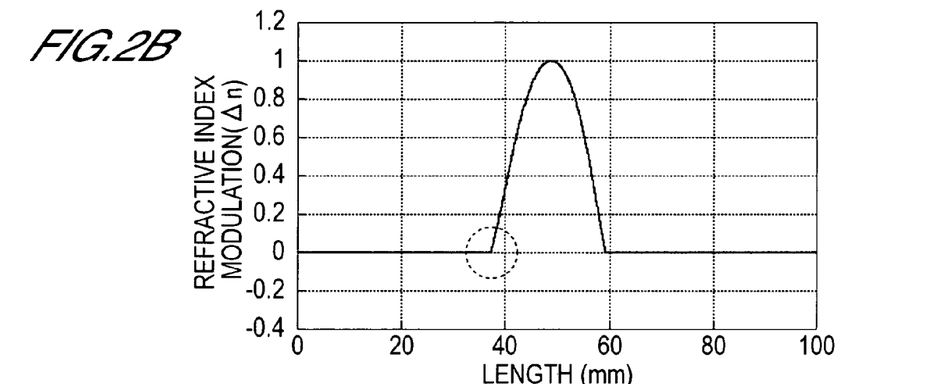

FIG. 2B shows the relationship between the distance from the I/O terminal of the SSFBG and the refractive index modulation. The horizontal axis shows the distance from the I/O terminal of the SSFBG to scale in mm units and the vertical scale represents the size Δn of the refractive index modulation with the maximum value normalized as 1. When the maximum value of the refractive index with respect to light of the Bragg reflection wavelengths of the optical fiber to which the FBG is fixed is expressed as n+Δn and the minimum value is expressed as n, Δn refers to the size of the refractive index modulation. This means that the FBG is formed by changing the refractive index periodically in the longitudinal direction of the optical fiber but the difference between the maximum and minimum values of the effective refractive index is Δn.

Figure 2C:
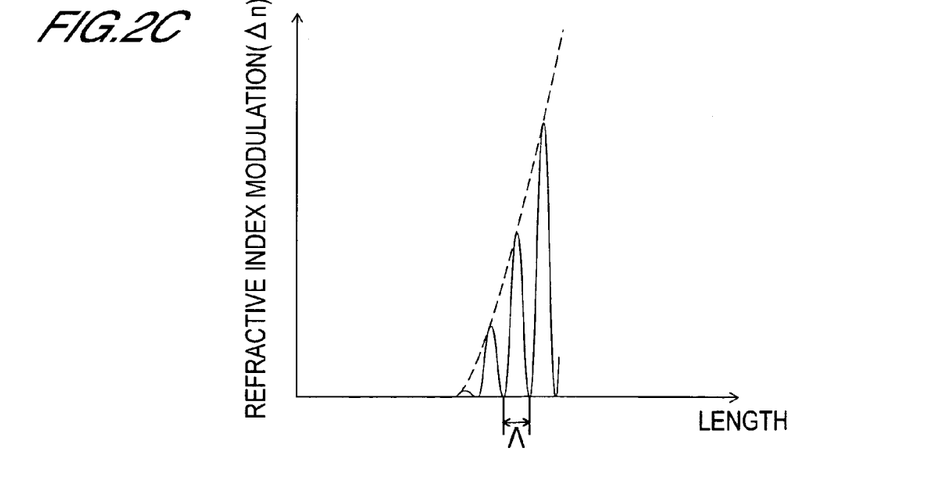

FIG. 2C is an enlargement of the part surrounded by a broken-line circle in FIG. 2B. The horizontal axis shows the distance from the I/O terminal of the FBG to scale in mm units and the vertical axis shows the size Δn of the refractive index modulation by means of an optional scale. The waveform indicated by the solid line shows the distribution of the size of the refractive index modulation and represents the refractive index structure of the FBG. The broken line shows the envelope of the distribution curve representing the size of the refractive index modulation indicated by the solid line. The curve shown in FIG. 2B shows this envelope.

In FIGS. 2A, 2B, and 2C, the refractive index modulation cycle Λ of the FBG is set at 0.5353 nm so that the center wavelength of the Bragg reflection spectral is 1550 nm. The overall length of the FBG is then 22 mm. That is, the positions in which the envelope shown in FIG. 2B intersects the horizontal axis that indicates that the size Δn of the refractive index modulation is 0 are 37 mm and 59 mm and, therefore, the formation of the refractive index modulation structure is in the range of 37 mm to 59 mm on the horizontal axis. It is therefore clear that the overall length of the FBG is 22 mm.

As shown in FIG. 2A, it can be seen that the Bragg reflection spectral of an FBG with the refractive index modulation characteristic shown in FIG. 2B has the characteristic of being represented by a bell-shaped curve. Hence, when the wavelength at which the Bragg reflectivity is maximum is displaced a little, the reflectivity drops sharply.

The wavelength at which the Bragg reflectivity is maximum is sometimes slightly displaced under the effect of fluctuations in the peripheral temperature of the FBG. When the Bragg reflectance spectral of the FBG has the characteristic of being represented by a bell-shaped curve, in an optical code division multiplexing transceiver device that is constituted by adopting an optical pulse time spreading device constituted by using the SSFBG as an optical encoder or optical decode, a slight displacement of the wavelength set as the wavelength to be identified as design signal light and the wavelength at which the Bragg reflectivity is maximum simply induces erroneous operation of the device.

In order to solve this problem, the shape of the Bragg reflectance spectral is not a bell-shaped curve and the refractive index modulation structure of the FBG may be formed as a flat-top curve. If the Bragg reflectance spectral has the characteristic of being given by a flat-top curve, even when the wavelength at which the Bragg reflectivity is maximum is slightly displaced, the reflectance does not drop sharply. As a result, even when the wavelength set as the wavelength to be identified as design signal light and the wavelength at which the Bragg reflectivity is maximum are slightly displaced, erroneous operation of the device is not readily produced.

The refractive index modulation structure of the FBG satisfied by the request will now be described with reference to FIGS. 3A, 3B, and 3C. The optical pulse time spreading device of the present invention can be constituted if an SSFBG is formed with the FBGs shown here as the unit FBGs.

Figure 3A:
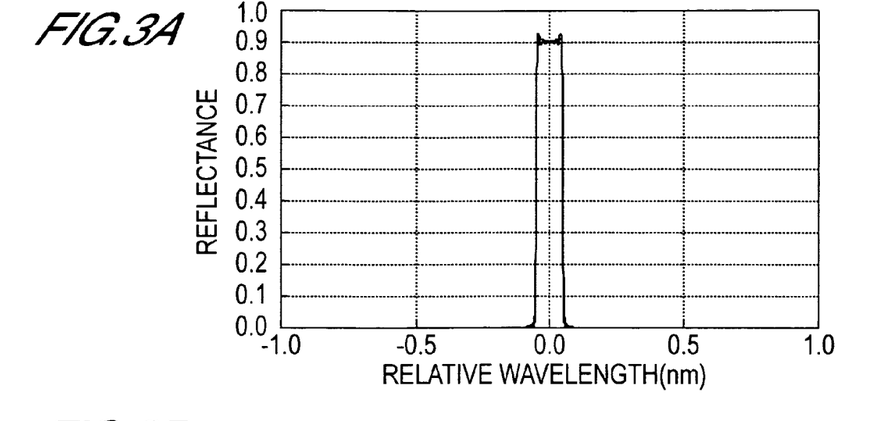
FIG. 3A-3C shows the refractive index distribution structure of an FBG that produces a flat-top Bragg reflection characteristic.

FIG. 3A shows a Bragg reflection spectral. The horizontal axis is a scale in which the relative wavelength is in nm units and the vertical axis shows the relative value of the size of the refractive index by means of an optional scale of 0 to 1. The relative wavelength shown on the horizontal axis also has, as per FIG. 2A, a Bragg reflection center wavelength of 1550 nm and shows a Bragg reflectance spectral with respect to a range of 1549 nm to 1551 nm.

Figure 3B:
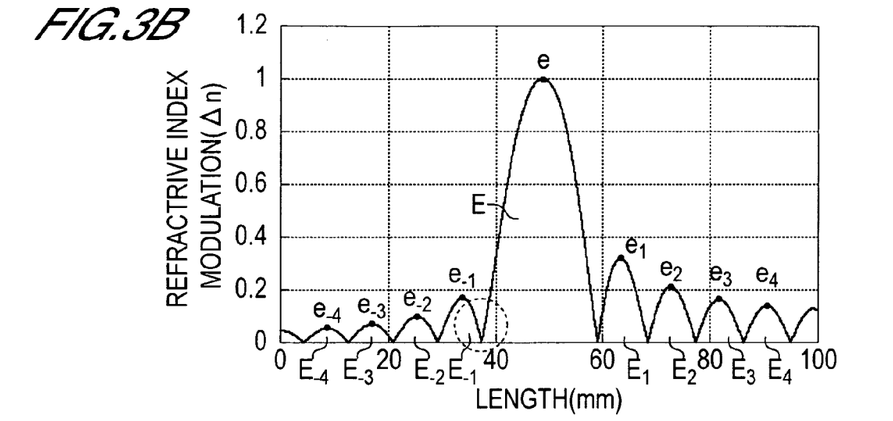

FIG. 3B shows the relationship between the distance from the I/O terminal of the FBG and the refractive index modulation. The horizontal axis shows the distance from the I/O terminal of the FBG to scale in mm units and the vertical scale represents the size $\Delta n$ of the refractive index modulation with the maximum value normalized as 1.

Figure 3C:
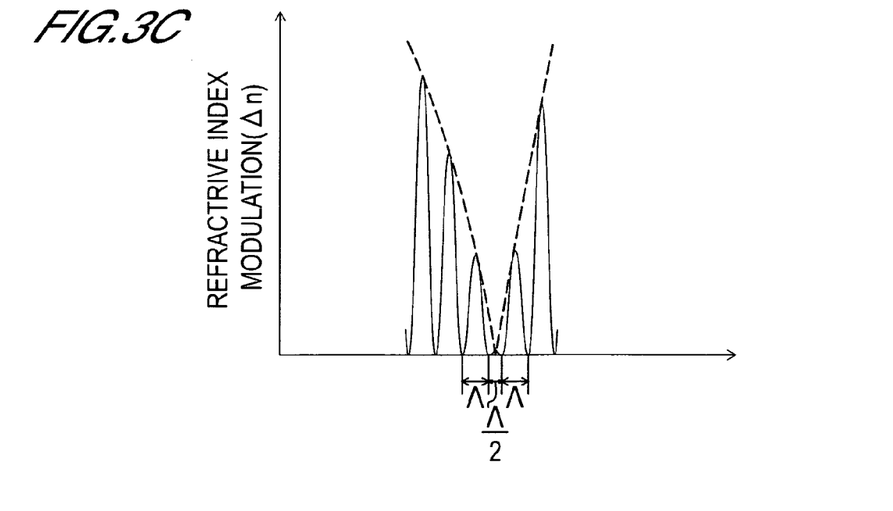

FIG. 3C is an enlargement of the part surrounded by a broken-line circle in FIG. 3B. The horizontal axis shows the distance from the I/O terminal of the FBG to scale in mm units and the vertical axis shows the size $\Delta n$ of the refractive index modulation by means of an optional scale. The waveform indicated by the solid line shows the value of the reflectance and represents the refractive index structure of the FBG. The broken line shows the envelope of the distribution curve representing the size of the refractive index modulation indicated by the solid line. The curve shown in FIG. 3B shows this envelope.

So too in the case of the FBG shown in FIGS. 3A, 3B, and 3C, the refractive index modulation cycle $\Lambda$ of the FBG is set at 0.5353 nm so that the center wavelength of the Bragg reflection spectral is 1550 nm. However, the overall length of the FBG is then 100 mm and may be longer than the FBG shown in FIGS. 2A, 2B, and 2C. This is because, as will be described subsequently, the shape of the Bragg reflectance spectral is a flat-top curve rather than a bell-shaped curve.

The difference between the characteristics shown in FIGS. 2B and 2C and the characteristics shown in FIGS. 3B and 3C that shows an aspect of the distance from the I/O terminal of the FBG and the modulation of the refractive index thereof lies with the shape of the envelope and the periodic refractive index modulation structure contained in the envelope. The envelope shown in FIG. 2B does not adopt a value or 0 or more again upon reaching a position on the horizontal axis at which the size $\Delta n$ of the refractive index modulation is equal to 0 (point of intersection between the envelope and the horizontal axis) from a value greater than 0, whereas the positions on the horizontal axis at which the size $\Delta n$ of the refractive index modulation of the envelope shown in FIG. 3B is equal to 0 (minimum position of interception with the horizontal axis) exist at a plurality of points in the form of points.

The region divided by the positions on the horizontal axis of interception at $\Delta n=0$ (the maximum position of interception with the horizontal axis) is divided by assigning code as follows. That is, as shown in FIG. 3B, the region containing a maximum which is the greatest maximum value is indicated by E and, in drawing closer to the I/O terminal, the region is divided so that only one maximum is contained in each of the resulting regions. The respective regions are indicated by $E_{-1}$, $E_{-2}$, $E_{-3}$, and $E_{-4}$. On the other hand, in moving further away than E from the I/O terminal, the region is similarly divided so that only one maximum is contained in each of the resulting regions. The respective regions are indicated by $E_1$, $E_2$, $E_3$, and $E_4$.

Thus, the FBG shown in FIGS. 3A, 3B, and 3C comprises, other than the sub-refractive index modulation structure contained in region E, the sub-refractive index modulation structures contained in regions $E_{-1}$, $E_{-2}$, $E_{-3}$, $E_{-4}$, $E_1$, $E_2$, $E_3$, and $E_4$. Hence, the overall length of this FBG is greater than the FBG shown in FIGS. 2A, 2B, and 2C. Here, as shown in FIG. 3B, the Bragg reflectance spectral shown in FIG. 3A is found by means of simulation by restricting same to a periodic refractive index modulation structure that covers a range of 100 mm from the I/O terminal of the FBG (restricting the overall length of the FBG to 100 mm).

Further, the sub-refractive index modulation structures are fixed such that the phases of the Bragg reflected light produced by each of the sub-refractive index modulation structures contained in the regions $E_{-1}$, $E_{-2}$, $E_{-3}$, $E_{-4}$, $E_1$, $E_2$, $E_3$, and $E_4$ have the following relationship. That is, the phase difference of the Bragg reflected light produced by the sub-refractive index modulation structures contained in the adjacent regions is established to equal $\pi$.

More specifically, supposing that the phase of the Bragg reflected light generated by the sub-refractive index modulation structure contained in region E that contains the maximum of the greatest size is the reference, a difference of $\pi$ exists in the phases of the Bragg reflected light generated by the sub-refractive index modulation structures contained in the envelopes of regions $E_{-1}$ and $E_1$. The phases of the Bragg reflected light generated by the sub-refractive index modulation structures contained in the envelopes of regions $E_{-2}$ and $E_2$ are the same phase. Likewise, the phases of the Bragg reflected light generated by the sub-refractive index modulation structures contained in the envelopes of regions $E_{-3}$ and $E_3$ have a phase difference $\pi$. The phases of the Bragg reflected light generated by the sub-refractive index modulation structures contained in the envelopes of regions $E_{-4}$ and $E_4$ have the same phase.

The specific structure for generating the phase relationships of the Bragg reflected light produced by each of the 5 sub-refractive index modulation structures contained in the regions $E_{-1}$, $E_{-2}$, $E_{-3}$, $E_{-4}$, $E_1$, $E_2$, $E_3$, and $E_4$ described above will now be described with reference to FIG. 3C. The positions on the horizontal axis at which the size Δn of the refractive index modulation of the envelope touches the horizontal axis at Δn=0 demarcate the abovementioned regions $E_{-1}$, $E_{-2}$, $E_{-3}$, $E_{-4}$, $E_1$, $E_2$, $E_3$, and $E_4$. Therefore, the way in which a periodic refractive index modulation structure is obtained by interposing positions at which the envelope touches the horizontal axis will now be described with reference to the enlargement of FIG. 3C. Although a part that demarcates the regions E and $E_{-1}$ is shown in FIG. 3C, the same is true of any part that demarcates adjacent regions.

The cycle of the periodic refractive index modulation structure is Λ irrespective of the region. Therefore, in the same region, the minima of the periodic refractive index modulation structure (point of interception with the horizontal axis) stand in a line at Λ intervals. However, the interval between positions constituting minima (points touching the horizontal axis) of the periodic refractive index modulation structure is Λ/2 as a result of the interposition of the position in which the envelope touches the horizontal axis (position demarcating regions E and $E_{-1}$). Hence, it can be seen that the phase difference between the Bragg reflected light produced by the sub-refractive index modulation structure contained by region E and the Bragg reflected light produced by the sub-refractive index modulation structure contained by region $E_{-1}$ is exactly π.

Furthermore, as shown in FIG. 3B, the maximum values of the envelope contained in regions $E_{-1}$, $E_{-2}$, $E_{-3}$, $E_{-4}$, E, $E_1$, $E_2$, $E_3$, and E4 are $e_{-1}$, $e_{-2}$, $e_{-3}$, $e_{-4}$, e, $e_1$, $e_2$, $e_3$, and $e_4$ respectively with one maximum value contained in each region. The positions of these maxima appear in periodic positions in the longitudinal direction of the optical waveguide as is clear from FIG. 3B. These maximum values increase monotonously in the order $e_{-1}$, $e_{-2}$, $e_{-3}$, $e_{-4}$, and e in the longitudinal direction of the optical waveguide and decrease monotonously in the order e, $e_1$, $e_2$, $e_3$, and $e_4$.

According to FIG. 3B, the proportions of the increase per unit length of the size of the values of $e_{-1}$, $e_{-2}$, $e_{-3}$, $e_{-4}$, and e in the direction of propagation of light are $e_{-3}/e_{-4}$, $e_{-2}/e_{-3}$, $e_{-1}/e_{-2}$, and $e/e_{-1}$ respectively because $e_{-1}$, $e_{-2}$, $e_{-3}$, $e_{-4}$, and e appear in periodic positions in the longitudinal direction of the optical waveguide. Further, the proportions of the decrease per unit length of the size of the values of e, $e_1$, $e_2$, $e_3$, and $e_4$ in the direction of propagation of light are $e/e_1$, $e_1/e_2$, $e_2/e_3$, and $e_3/e_4$ respectively. The proportions of the increase of $e_{-3}/e_{-4}$, $e_{-2}/e_{-3}$, $e_{-1}/e_{-2}$, and $e/e_{-1}$ are larger than the proportions of the decrease of $e/e_1$, $e_1/e_2$, $e_2/e_3$, and $e_3/e_4$ respectively. That is, this can be seen from that fact that $e_1 > e_{-1}$, $e_2 > e_{-2}$, $e_3 > e_{-3}$, and $e_4 > e_{-4}$.

Thus, if the proportions of the increase per unit length in the direction of propagation of light of the maximum values of the envelope are set greater than the proportions of the decrease, a suitable optical pulse time spreading device that is used as an optical encoder can be constituted. Further, if the proportions of the increase per unit length in the direction of propagation of light of the maximum values of the envelope are set smaller than the decreasing proportions, a suitable optical pulse time spreading device that is used as an optical decoder can be constituted. Naturally, the proportions of the increase per unit length in the direction of propagation of light of the maximum values of the envelope may also be set so that these proportions are the opposite of the aforementioned proportions of the optical encoder and optical decoder above.

With an FBG that has the periodic refractive index modulation structure shown in FIG. 3B, it is clear that the Bragg reflectance spectral has the characteristic of being expressed by a flat-top curve as shown in FIG. 3A. As a result, even when the wavelength at which the Bragg reflectivity is maximum is slightly displaced, the reflectivity does not drop sharply. Even when the wavelength at which the Bragg reflectivity is maximum is slightly displaced due to the effect of fluctuations in the temperature surrounding the FBG, the probability of erroneous operation of the device being induced is low for a device that is constituted by using an FBG or SSFBG.

Phase Control Means of Optical Pulse Time Spreading Device

Figure 4:
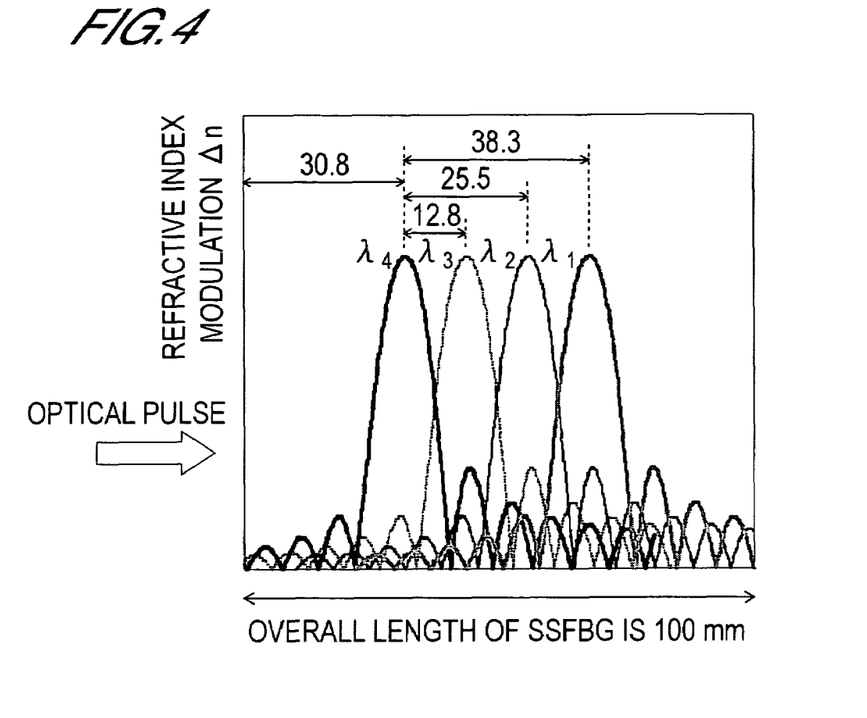
FIG. 4 shows the refractive index distribution structure of a unit FBG that constitutes an SSFBG.

The structure and characteristics of the phase control means of an optical pulse time spreading device with the specifications shown in Tables 1 and 2 will be described next with reference to FIG. 4. FIG. 4 shows the envelopes of distribution curves that represent the sizes of the refractive index modulation of four unit FBGs that constitute the periodic refractive index distribution structure of an SSFBG. The horizontal axis shows the distance from the I/O terminal of the SSFBG in mm units. The left end of the horizontal axis corresponds to the position of the I/O terminal of the SSFBG and the right end corresponds to the terminal on the opposite side from the I/O terminal of the SSFBG. The vertical axis shows the size Δn of the refractive index modulation on an optional scale. In FIG. 4, as can be easily seen, an aspect in which an optical pulse is input from the left end is schematically shown. Further, the overall length of the SSFBG, which is the distance from the I/O terminal of the SSFBG to the terminal on the opposite side, is 100 mm.

The operating characteristics (relative group delay times) of the SSFBG constituting the phase control means of the optical pulse time spreading device are shown together in Table 1. Further, the positions of the unit FBGs that constitute the SSFBG are shown together in Table 2.

TABLE 1

| CENTER WAVELENGTH | RELATIVE GROUP DELAY TIME (ps) | | | |
|---|---|---|---|---|
| $\lambda_c$ 1543.76 nm | $\lambda_1$ (−0.48 nm) | $\lambda_2$ (−0.16 nm) | $\lambda_3$ (+0.16 nm) | $\lambda_4$ (+0.48 nm) |
| OPTICAL ENCODER | 375 | 250 | 125 | 0 |
| OPTICAL DECODER | 0 | 125 | 250 | 375 |

TABLE 2

| CENTER WAVELENGTH | UNIT FBG RELATIVE POSITION (mm) | | | |
|---|---|---|---|---|
| $\lambda_c$ 1543.76 nm | $\lambda_1$ (−0.48 nm) | $\lambda_2$ (−0.16 nm) | $\lambda_3$ (+0.16 nm) | $\lambda_4$ ZZ(+0.48 nm) |
| OPTICAL ENCODER | 38.3 | 25.5 | 12.8 | 0 |

TABLE 2-continued

| CENTER WAVE-LENGTH | UNIT FBG RELATIVE POSITION (mm) | | | |
|---|---|---|---|---|
| $\lambda_c$ 1543.76 nm | $\lambda_1$ (−0.48 nm) | $\lambda_2$ (−0.16 nm) | $\lambda_3$ (+0.16 nm) | $\lambda_4$ ZZ(+0.48 nm) |
| OPTICAL DECODER | 0 | 12.8 | 25.5 | 38.3 |

The SSFBG shown in Tables 1 and 2 sets the center wavelength $\lambda_c$ at 1543.76 nm. Therefore, the Bragg reflection wavelengths $\lambda_1$, $\lambda_2$, $\lambda_3$, and $\lambda_4$ set for each of the four unit FBGs are $(\lambda_c-0.48)$ nm, $(\lambda_c-0.16)$ nm, $(\lambda_c+0.16)$ nm, and $(\lambda_c+0.48)$ nm. Hence, $\lambda_1$=1543.28 nm, $\lambda_2$=1543.60 nm, $\lambda_3$=1543.92 nm, and $\lambda_4$=1544.24 nm.

The relative group delay times shown in Table 1 signify the relative time difference of the time in which an optical pulse containing $\lambda_1$, $\lambda_2$, $\lambda_3$, and $\lambda_4$ as wavelength components enters the I/O terminal of the SSFBG, the optical pulse is subjected to time-spreading/wavelength hopping, and the chip pulses thus output are output from the I/O terminal. When the field displayed as the 'optical encoder' of Table 1 is viewed, the numerical values 375, 250, 125, and 0 are lined up in correspondence with $\lambda_1$, $\lambda_2$, $\lambda_3$, and $\lambda_4$. This indicates that, when an optical pulse containing $\lambda_1$, $\lambda_2$, $\lambda_3$, and $\lambda_4$ as wavelength components has entered the I/O terminal of the SSFBG, a chip pulse of wavelength $\lambda_4$ is first output from the I/O terminal and chip pulses of wavelength $\lambda_3$, wavelength $\lambda_2$, and wavelength $\lambda_1$, are output at a delay of 125 ps, 250 ps, and 375 ps respectively.

On the other hand, when the field displayed as the 'optical decoder' of Table 1 is viewed, numerical values of 0, 125, 250, and 375 are lined up in correspondence with $\lambda_1$, $\lambda_2$, $\lambda_3$, and $\lambda_4$ in reverse order to that of the field displayed as 'optical encoder'. This is because the arrangement order from the perspective of the I/O terminal of the unit FBG is the reverse of that of the optical encoder. Hence, as a result of the chip pulses output by the optical encoder being input to the optical decoder, the relative group delay times supplied to the chip pulses the wavelengths of which are $\lambda_1$, $\lambda_2$, $\lambda_3$, and $\lambda_4$ offset each other and the original optical pulse containing $\lambda_1$, $\lambda_2$, $\lambda_3$, and $\lambda_4$ as wavelength components is restored.

Table 2 shows the specifications of the SSFBG shown in Table 1 by means of the distance from the I/O terminal of the four unit FBGs. In order to produce the relative group delay times shown in Table 1, the particular positions from the I/O terminal in which the four unit FBGs may be established are shown in mm units. When the field displayed as 'optical encoder' of Table 2 is viewed, the numerical values of 38.3, 25.5, 12.8, and 0 are lined up in correspondence with $\lambda_1$, $\lambda_2$, $\lambda_3$, and $\lambda_4$. These indicate the maximum positions of the envelope of the curve representing the size Δn of the refractive index modulation of the respective unit FBGs from the I/O terminal of the SSFBG. When the field displayed as 'optical decoder' of Table 2 is viewed, numerical values are naturally lined up in reverse order to that of the field displayed as 'optical encoder' in correspondence with $\lambda_1$, $\lambda_2$, $\lambda_3$, and $\lambda_4$ as per Table 1 above.

With regard to the specifications of the SSFBG shown in Tables 1 and 2, in order to make the above description easy to understand, a unit FBG the Bragg reflection wavelength of which is $\lambda_4$ is disposed in the I/O terminal of the SSFBG. However, in reality, in an optical pulse time spreading device that is used as an optical encoder or optical decoder, a unit FBG is not disposed in the I/O terminal of the SSFBG but is instead disposed at a fixed distance therefrom. This is because, when a unit FBG is disposed in the I/O terminal of the SSFBG, non of the chip pulses generated by unit FBG disposed in the I/O terminal are supplied with a phase delay, which poses a problem when the optical pulse time spreading device is used in an optical code division multiplexing device.

It can be seen that four unit FBGs the Bragg reflection wavelengths of which are $\lambda_1$, $\lambda_2$, $\lambda_3$, and $\lambda_4$ are established in the SSFBG constituting the phase control means shown in FIG. 4 and that the unit FBGs are disposed with a part where the unit FBGs overlap one another in the waveguide direction of the optical fiber. The maximum position of the envelope of the curve representing the size Δn of the refractive index modulation of each of the four unit FBGs is established as follows in order starting from the I/O terminal as shown in FIG. 4. The maximum position at which the greatest maximum value of the unit FBG the Bragg reflection wavelength of which is $\lambda_4$ is obtained is established in a position 30.8 mm from the I/O terminal. Further, the maximum positions at which the greatest maximum values of the unit FBGs the Bragg reflection wavelengths of which are $\lambda_3$, $\lambda_2$, and $\lambda_1$ are obtained are established in positions 12.8 mm, 25.5 mm, and 38.3 mm respectively further apart from the maximum position at which the greatest maximum value of the unit FBG the Bragg reflection wavelength of which is $\lambda_4$ is obtained.

The SSFB shown in FIG. 4 represents an example in which the optical pulse time spreading device is manufactured as an optical encoder and, when the optical decoder for which the same time-spreading/wavelength hopping code has been set is manufactured to correspond with the optical encoder, the arrangement order of the four unit FBGs the Bragg reflection wavelengths of which are $\lambda_1$, $\lambda_2$, $\lambda_3$, and $\lambda_4$ is then the reverse from the perspective of the I/O terminal. The four unit FBGs the Bragg reflection wavelengths of which are $\lambda_1$, $\lambda_2$, $\lambda_3$, and $\lambda_4$ of the SSFB shown in FIG. 4 are disposed at equal intervals such that the interval therebetween is 12.8 mm. The time-spreading/wavelength hopping code set for the SSFBG is $(\lambda_1, \lambda_2, \lambda_3, \text{ and } \lambda_4)$.

The refractive index distributions of the four unit FBGs the Bragg reflection wavelengths of which are $\lambda_1$, $\lambda_2$, $\lambda_3$, and $\lambda_4$ have the characteristics described with reference to FIGS. 3A, 3B, and 3C above in common. Hence, in comparison with a conventional unit FBG described with reference to FIGS. 2A, 2B, and 2C, the overall length is long and there is a part where the unit FBGs overlaps one another in the longitudinal direction of the optical fiber.

Figure 5:
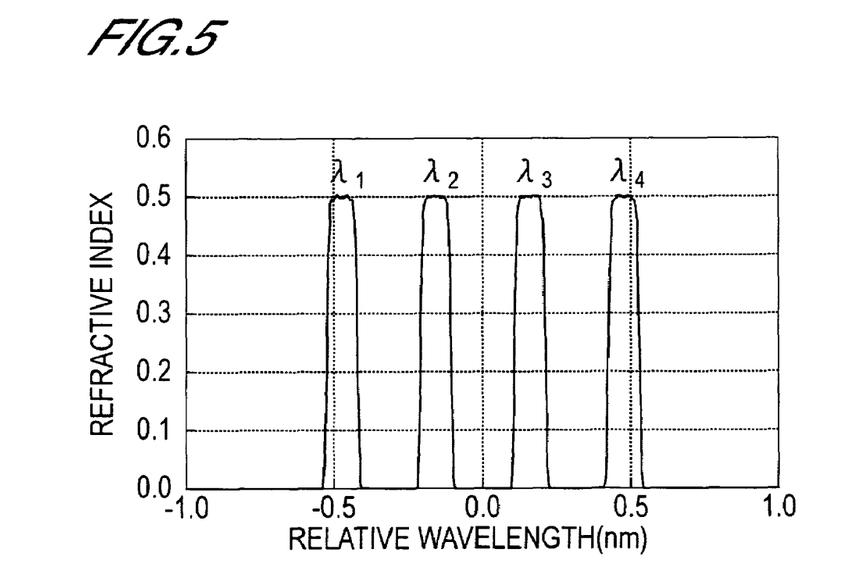
FIG. 5 shows a Bragg reflection characteristic of an optical pulse time spreading device.

The relative wavelength of the Bragg reflection of the SSFBG shown in FIG. 4 will now be described with reference to FIG. 5. The horizontal axis of FIG. 5 shows the position of the center wavelength $\lambda_c$ as 0.0 nm and the relative wavelength of the Bragg reflection in nm units. The vertical axis shows the Bragg reflectivity by means of an optional scale. Here, because $\lambda_c$ is 1543.76 nm, it may be read that the Bragg reflection characteristic shown in FIG. 5 exhibits a reflection peak in the positions of the Bragg reflection wavelengths set for each of the four unit FBGs, namely, $\lambda_1$=1543.28 nm, $\lambda_2$=1543.60 nm, $\lambda_3$=1543.92 nm, and $\lambda_4$=1544.24 nm.

Furthermore, the spectral characteristic curve is a flat-top curve. As mentioned earlier, this is due to the fact that the size of the maximum value of the envelope that links the maxima of the refractive index distribution of the unit diffraction gratings is set to decrease monotonously after increasing monotonously in the longitudinal direction of the optical waveguide, the fact that the phase difference of the Bragg reflected light produced by the sub-refractive index modulation structure contained in the adjacent regions is set to equal π, and the fact that the proportion of the increase per unit length in the direction of the propagation of light of the maximum value of the envelope that links the maxima of the periodic refractive index distribution is set greater than the proportion of the decrease of the maximum value.

Furthermore, the SSFBG according to the present invention is set such that the group delay time of the respective unit FBGs increases monotonously in correspondence with increased distances, from the I/O terminal, of the position where each of the unit FBGs are disposed.

With regard to this point, the spectral characteristic of the Bragg reflected light of the SSFBG shown in FIG. 4 and Tables 1 and 2 above will be described with reference to FIG. 6 and Table 3.

The relative group delay times of the Bragg reflected light of the respective unit FBGs constituting the SSFBG whose overall length is 100 mm are shown together in Table 3.

TABLE 3

| CENTER WAVE-LENGTH | RELATIVE GROUP DELAY TIME (ps) | | | |
|---|---|---|---|---|
| $\lambda_c$ 1543.76 nm | $\lambda_1$ (−0.48 nm) | $\lambda_2$ (−0.16 nm) | $\lambda_3$ (+0.16 nm) | $\lambda_4$ (+0.48 nm) |
| OPTICAL ENCODER | 675 | 550 | 425 | 300 |
| OPTICAL DECODER | 300 | 425 | 550 | 675 |

Table 3 shows the center wavelength $\lambda_c$ as 1543.76 nm as per Tables 1 and 2 and the Bragg reflection wavelengths set for each of the four unit FBGs are $\lambda_1$=1543.28 nm, $\lambda_2$=1543.60 nm, $\lambda_3$=1543.92 nm, and $\lambda_4$=1544.24 nm respectively.

Constant values are contained in the relative group delay times of the Bragg reflected light shown in Table 3. That is, as shown in FIG. 4, the position L, from the I/O terminal, of the unit FBG the Bragg reflection wavelength of which is $\lambda_1$ is 69.1 mm (=30.8+38.3) and, when this is converted to the group delay time, this corresponds to 675 ps. Suppose that the position L, from the I/O terminal of the SSFBG, of the unit FBG the Bragg reflection wavelength of which is $\lambda_4$ is set at 0 mm, the position L of the unit FBG the Bragg reflection wavelength of which is $\lambda_1$ is then 38.3 mm. When position L is converted into a group delay time, this corresponds to 375 ps. That is, a constant term equivalent to 300 ps that corresponds to 30.8 mm is contained by converting position L into a group delay time. This constant term means that the position L, from the I/O terminal of the SSFBG, of the unit FBG the Bragg reflection wavelength of which is $\lambda_4$ is not placed at 0 mm and that the position L from the I/O terminal is placed in a 30.8 mm position.

The reason why the placement positions of the unit FBGs with respect to the I/O terminal of the SSFBG are reversed for the optical encoder and optical decoder in Table 3 has already been described.

Figure 6:
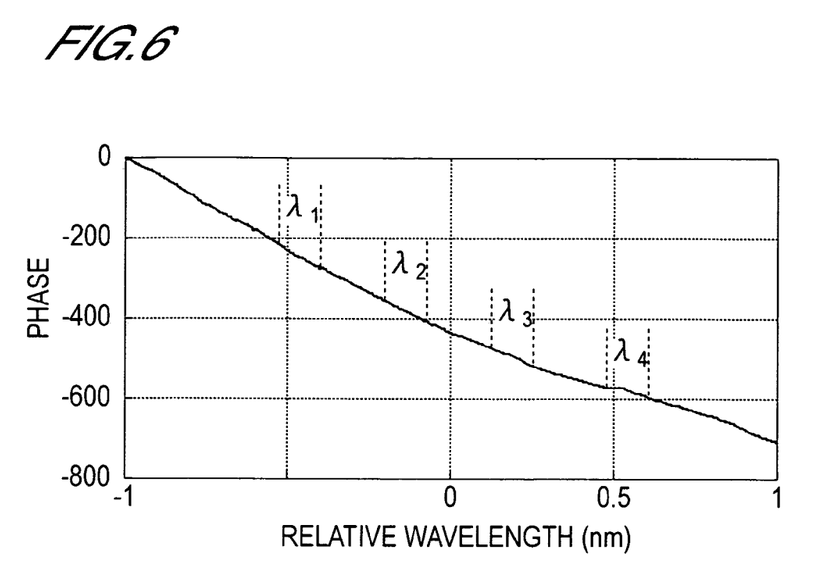
FIG. 6 shows the relationship of the phase with respect to the relative wavelength.

FIG. 6 shows the relationship, with respect to the relative wavelength, of the phase of Bragg reflected light output by the I/O terminal of the SSFBG when white light (light containing all the so-called wavelength components) is made to enter the SSFBG that constitutes the optical encoder shown in Table 3. In FIG. 6, the relative wavelength region indicated as $\lambda_1$ corresponds to the Bragg reflection spectral bandwidth of the unit FBG the Bragg reflection wavelength of which is $\lambda_1$ (the center wavelength of the Bragg reflection wavelength is $\lambda_1$). Likewise, the relative wavelength regions each denoted as $\lambda_2$, $\lambda_3$, and $\lambda_4$ correspond to the Bragg reflection spectral bandwidths of the respective unit FBGs the Bragg reflection wavelengths of which are $\lambda_2$, $\lambda_3$, $\lambda_4$ (the center wavelengths of the Bragg reflection wavelengths are $\lambda_2$, $\lambda_3$, and $\lambda_4$).

The relative group delay times of the Bragg reflected light shown in the optical encoder field of Table 3 are provided by a tilt in the graph that shows the relationship of the phases shown in FIG. 6 with respect to the relative wavelengths. That is, the tilt in the graph in the respective regions the Bragg reflection wavelengths of which are $\lambda_1$, $\lambda_2$, $\lambda_3$, and $\lambda_4$ corresponds to the relative group delay times 675 ps, 550 ps, 425 ps, and 300 ps respectively of the Bragg reflected light. The unit FBGs the Bragg reflection wavelengths of which are $\lambda_1$, $\lambda_2$, $\lambda_3$, and $\lambda_4$ are disposed in the order $\lambda_4$, $\lambda_3$, $\lambda_2$, $\lambda_1$ starting from the side of the I/O terminal 20 and the tilt of the phases of the respective unit FBGs the Bragg reflection wavelengths of which are $\lambda_1$, $\lambda_2$, $\lambda_3$, and $\lambda_4$ decreases monotonously.

Figure 7:
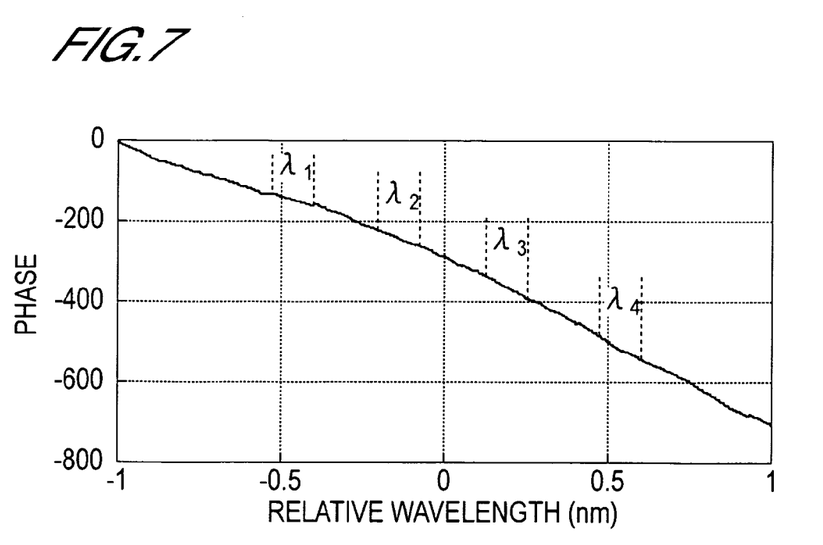
FIG. 7 shows the relationship of the phase with respect to the relative wavelength.

FIG. 7 shows the relationship, with respect to the relative wavelength, of the phases of the Bragg reflected light output by the I/O terminal of the SSFBG when white light (light containing all the so-called wavelength components) is made to enter the SSFBG that constitutes the optical decoder shown in Table 3. In FIG. 7, the relative wavelength regions indicated as $\lambda_1$, $\lambda_2$, $\lambda_3$, and $\lambda_4$ correspond to the Bragg reflection spectral bandwidths of the unit FBGs the Bragg reflection wavelengths of which are $\lambda_1$, $\lambda_2$, $\lambda_3$, and $\lambda_4$.

The relative group delay times of the Bragg reflected light shown in the field of the optical decoder of Table 3 are supplied by means of the tilt of the graph that represents the relationship of the phases shown in FIG. 7 with respect to the relative wavelength in the same way as the case of FIG. 6. In the optical decoder, because the unit FBGs are disposed in the order $\lambda_1$, $\lambda_2$, $\lambda_3$, and $\lambda_4$ starting from the side of the I/O terminal 20, which is the reverse of the optical encoder, the tilt, with respect to wavelength, of the phases of the respective unit FBGs the Bragg reflection wavelengths of which are $\lambda_1$, $\lambda_2$, $\lambda_3$, and $\lambda_4$ becomes monotonously pronounced.

In the above description, a case where an SSFBG with the characteristic shown in FIG. 6 is the optical encoder and the SSFBG with the characteristic shown in FIG. 7 is the optical decoder was described. However, naturally, the reverse is also acceptable, i.e. the SSFBG with the characteristic shown in FIG. 7 may be the optical encoder and the SSFBG with the characteristic shown in FIG. 6 may be the optical decoder.

A refractive index distribution structure of an SSFBG set with the relative group delay times shown in the optical encoder field in Table 3 will now be illustrated with reference to FIGS. 8A and 8B. Because the following description of the refractive index distribution structure of an SSFBG set with the relative group delay times shown in the optical decoder field in Table 3 is valid as it is except for the details, an illustration is omitted.

Figure 8A:
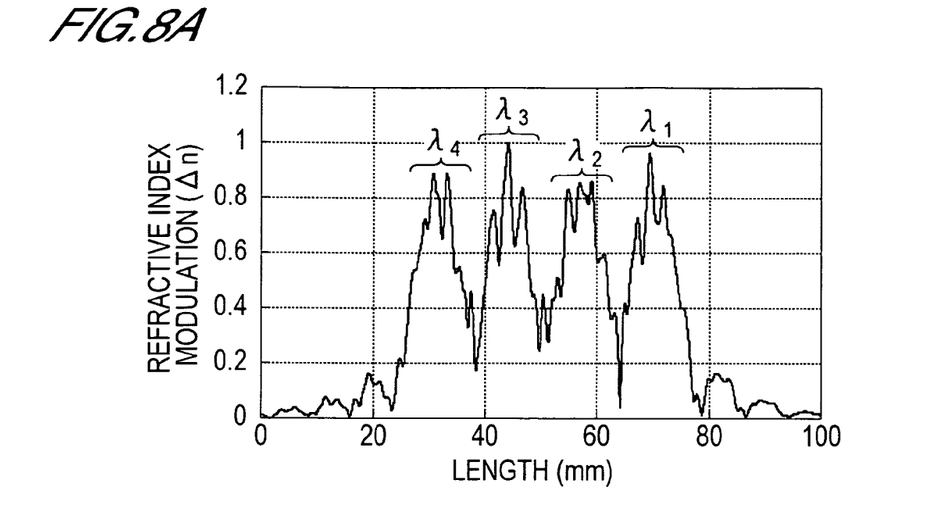
FIG. 8A-8B shows the refractive index distribution structure of an SSFBG.

FIG. 8A shows the distance from the I/O terminal 20 to scale on the horizontal axis in mm units and the vertical axis shows the maximum of size Δn of the refractive index modulation normalized to 1 and the envelope thereof. The refractive index distribution structure of the SSFBG shown in FIG. 8A is a correlation obtained by adding together the refractive index modulations Δn of the respective FBGs constituting the SSFBG shown in FIG. 4. That is, in FIG. 4, the refractive index modulations Δn of the respective FBGs constituting the SSFBG are only shown individually overlapping in the drawings. However, in FIG. 8A, the actual refractive index modulations Δn obtained by superimposing the refractive index modulations Δn of the respective FBGs are shown. Therefore, in FIG. 4, the part where the respective FBGs overlap one another has a very complicated refractive index modulation structure as a result of the different inherent refractive index modulations of the respective FBGs (the cycles shown as Λ in FIGS. 2 and 3) being added together.

In FIG. 8A, the parts shown as $\lambda_4$, $\lambda_3$, $\lambda_2$, and $\lambda_1$ show the approximate positions where the unit FBGs the Bragg reflection wavelengths of which are $\lambda_4$, $\lambda_3$, $\lambda_2$, and $\lambda_1$ are disposed. In FIG. 4, the maximum positions indicated by the envelopes of the unit diffraction gratings the Bragg reflection wavelengths of which are $\lambda_4$, $\lambda_3$, $\lambda_2$, and $\lambda_1$ exist in the parts shown as $\lambda_4$, $\lambda_3$, $\lambda_2$, and $\lambda_1$ respectively in FIG. 8A. The maximum positions of the envelopes in FIG. 4 are the parts where the degree of refractive index modulation is the greatest and, therefore, the size of the refractive index modulation Δn of the parts shown as $\lambda_4$, $\lambda_3$, $\lambda_2$, and $\lambda_1$ in FIG. 8A are large in comparison with the peripheral parts. That is, the fact that unit FBGs the Bragg reflection wavelengths of which are $\lambda_4$, $\lambda_3$, $\lambda_2$, and $\lambda_1$ are disposed in the parts shown as $\lambda_4$, $\lambda_3$, $\lambda_2$, and $\lambda_1$ respectively can be read from the maximum positions indicated by the envelopes.

Figure 8B:
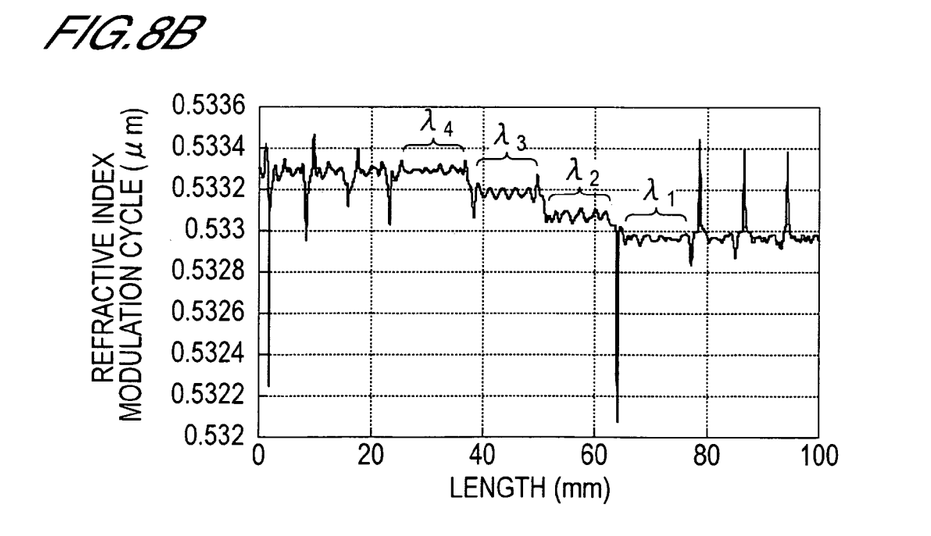

FIG. 8B shows an aspect of the change in the complicated refractive index modulation cycles above in the longitudinal direction of the SSFBG. The horizontal axis shows the distance from the I/O terminal to scale in mm units and the vertical axis shows the refractive index modulation cycle in the longitudinal direction of the SSFBG. So too in FIG. 8B, the parts shown as $\lambda_4$, $\lambda_3$, $\lambda_2$, and $\lambda_1$ show the approximate positions where unit FBGs the Bragg reflection wavelengths of which are $\lambda_4$, $\lambda_3$, $\lambda_2$, and $\lambda_1$ respectively are disposed.

In FIG. 8B, the refractive index modulation cycle of the range indicated by $\lambda_4$ is substantially 0.53329 μm, the refractive index modulation cycle of the range indicated by $\lambda_3$ is substantially 0.53318 μm, the refractive index modulation cycle of the range indicated by $\lambda_2$ is substantially 0.53307 μm, and the refractive index modulation cycle of the range indicated by $\lambda_1$ is substantially 0.53296 μm. The fact that the refractive index modulation cycle also increases as the Bragg reflection wavelengths grow longer in the order $\lambda_1$, $\lambda_2$, $\lambda_3$, and $\lambda_4$ may be read from FIG. 8B.

What is claimed is:

1. An optical pulse time spreading device that outputs an optical pulse as a train of chip pulses sequentially arranged on a time axis on the basis of code of a time-spreading and wavelength hopping system, comprising:
   an I/O terminal; and
   phase control means that converts said optical pulse input from said I/O terminal into a chip pulse train of the chip pulses that is obtained by supplying a phase difference between mutually adjacent chip pulses and returns said chip pulse train to said I/O terminal,
   wherein said phase control means comprises a plurality of unit diffraction gratings provided to correspond one for one with code values that constitute the code of said time-spreading and wavelength hopping system; and
   said plurality of unit diffraction gratings are disposed with a part where said unit diffraction gratings overlap one another in a waveguide direction of an optical waveguide.

2. The optical pulse time spreading device according to claim 1, wherein said plurality of unit diffraction gratings are formed as a periodic refractive index modulation structure formed by changing the refractive index periodically in the longitudinal direction of said optical waveguide;
   an envelope linking the maxima of a refractive index distribution also has a maximum in a periodic position in a longitudinal direction of said optical waveguide; and
   said refractive index distribution is formed so that the size of the maximum value of said envelope decreases monotonously after increasing monotonously in the longitudinal direction of said optical waveguide.

3. The optical pulse time spreading device according to claim 2, wherein said periodic refractive index modulation structure is divided so that only one maximum of said envelope is contained in each of a plurality of regions with the position in which said envelope takes a minimum value serving as the boundary; and said refractive index distribution is formed so that the phase difference of the Bragg reflected light produced by the adjacent regions is equal to $\pi$.

4. The optical pulse time spreading device according to claim 2, wherein the proportion of the increase of the maximum value of said envelope per unit length in the direction of propagation of light is greater than the proportion of the decrease of the maximum value.

5. The optical pulse time spreading device according to claim 2, wherein the proportion of the increase of the maximum value of said envelope per unit length in the direction of propagation of light is smaller than the proportion of the decrease of the maximum value.

6. The optical pulse time spreading device according to claim 1, wherein the Bragg reflection wavelengths of said plurality of unit diffraction gratings constituting said phase control means are different, and the phases of the Bragg reflected light between said respective unit diffraction gratings are established on the basis of the positions in which said respective unit diffraction gratings are disposed.

7. The optical pulse time spreading device according to claim 2, wherein the Bragg reflection wavelengths of said plurality of unit diffraction gratings constituting said phase control means are different, and the phases of the Bragg reflected light between said respective unit diffraction gratings are established on the basis of the positions in which said respective unit diffraction gratings are disposed.

8. The optical pulse time spreading device according to claim 3, wherein the Bragg reflection wavelengths of said plurality of unit diffraction gratings constituting said phase control means are different, and the phases of the Bragg reflected light between said respective unit diffraction gratings are established on the basis of the positions in which said respective unit diffraction gratings are disposed.

9. The optical pulse time spreading device according to claim 4, wherein the Bragg reflection wavelengths of said plurality of unit diffraction gratings constituting said phase control means are different, and the phases of the Bragg reflected light between said respective unit diffraction gratings are established on the basis of the positions in which said respective unit diffraction gratings are disposed.

10. The optical pulse time spreading device according to claim 5, wherein the Bragg reflection wavelengths of said plurality of unit diffraction gratings constituting said phase control means are different, and the phases of the Bragg reflected light between said respective unit diffraction gratings are established on the basis of the positions in which said respective unit diffraction gratings are disposed.

* * * * *